(12) United States Patent
Gandhi et al.

(10) Patent No.: US 10,712,957 B2
(45) Date of Patent: Jul. 14, 2020

(54) DISK STORAGE CAPACITY REORGANIZATION

(71) Applicant: INTERNATIONAL BUSINESS MACHINES CORPORATION, Armonk, NY (US)

(72) Inventors: Mohankumar Gandhi, Chennai (IN); Manoharan D, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/137,654

(22) Filed: Sep. 21, 2018

(65) Prior Publication Data

US 2020/0097197 A1    Mar. 26, 2020

(51) Int. Cl.
*G06F 3/06* (2006.01)

(52) U.S. Cl.
CPC .......... *G06F 3/0631* (2013.01); *G06F 3/0604* (2013.01); *G06F 3/0653* (2013.01); *G06F 3/0674* (2013.01)

(58) Field of Classification Search
CPC .... G06F 3/0604; G06F 3/0653; G06F 3/0631; G06F 3/0674
USPC ....................................................... 711/154
See application file for complete search history.

(56) References Cited

U.S. PATENT DOCUMENTS

| 8,019,799 | B1 | 9/2011 | Batterywala |
| 8,285,692 | B2 | 10/2012 | Johnson |
| 8,417,912 | B2 | 4/2013 | Olszewski |
| 2012/0072582 | A1* | 3/2012 | Kline ............... G06Q 10/06 709/224 |

FOREIGN PATENT DOCUMENTS

| WO | 2012023967 A3 | 5/2013 |
| WO | 2015116125 A | 8/2015 |

* cited by examiner

*Primary Examiner* — Hua J Song
(74) *Attorney, Agent, or Firm* — Schmeiser, Olsen & Watts; William H. Hartwell

(57) ABSTRACT

A method and system for improving disk capacity reorganization is provided. The method includes monitoring a utilization level of a disk storage space of a disk drive and determining that the utilization level has exceeded a utilization level threshold. Reorganization and associated alert hardware and software functionality associated with modifying the utilization level are analyzed and a first alert indicating that the utilization level has exceeded the utilization level threshold is transmitted to an alert system. A second alert is transmitted to the alert system. The second alert indicates that the disk storage space is claimed by decreasing a size of an identified filesystem or paging space and assigned to an affected filesystem or paging space. Likewise, a third alert indicating a consolidated message associated with the increase and the decrease is transmitted to the alert system.

18 Claims, 6 Drawing Sheets

DISK STORAGE CAPACITY REORGANIZATION

BACKGROUND

The present invention relates generally to a method for reorganizing disk storage capacity attributer and in particular to a method and associated system for improving data storage technology associated with automatically reorganizing a threshold breached filesystem and paging space and generating an associated alert.

SUMMARY

A first aspect of the invention provides a disk capacity reorganization improvement method comprising: monitoring via a plurality of sensors, by a processor of a hardware device executing daemon code, a utilization level of a disk storage space of a disk drive; determining, by the processor based on results of the monitoring, that the utilization level has exceeded a utilization level threshold; analyzing, by the processor, reorganization and associated alert hardware and software functionality associated with modifying the utilization level; transmitting, by the processor to an alert system, a first alert indicating that the utilization level has exceeded the utilization level threshold; decreasing, by the processor based on results of the analyzing, the utilization level; increasing, by the processor based on the results of the analyzing, the disk storage space of the disk drive, wherein the increasing and the decreasing occur until an actual size of the disk storage space is equivalent to a measured destination size for the disk storage space, wherein the measured destination size is automatically determined by referring configured parameter values; transmitting, by the processor to the alert system, a second alert indicating that the utilization level has decreased below the utilization level threshold such that the disk storage space is claimed by decreasing a size of an identified filesystem or paging space and assigned to an affected filesystem or paging space; and transmitting, by the processor to the alert system, a third alert indicating a consolidated message associated with the increasing and the decreasing.

A second aspect of the invention provides a computer program product, comprising a computer readable hardware storage device storing a computer readable program code, the computer readable program code comprising an algorithm that when executed by a processor of a hardware device implements a disk capacity reorganization improvement method, the method comprising: monitoring via a plurality of sensors, by the processor executing daemon code, a utilization level of a disk storage space of a disk drive; determining, by the processor based on results of the monitoring, that the utilization level has exceeded a utilization level threshold; analyzing, by the processor, reorganization and associated alert hardware and software functionality associated with modifying the utilization level; transmitting, by the processor to an alert system, a first alert indicating that the utilization level has exceeded the utilization level threshold; decreasing, by the processor based on results of the analyzing, the utilization level; increasing, by the processor based on the results of the analyzing, the disk storage space of the disk drive, wherein the increasing and the decreasing occur until an actual size of the disk storage space is equivalent to a measured destination size for the disk storage space, wherein the measured destination size is automatically determined by referring configured parameter values; transmitting, by the processor to the alert system, a second alert indicating that the utilization level has decreased below the utilization level threshold such that the disk storage space is claimed by decreasing a size of an identified filesystem or paging space and assigned to an affected filesystem or paging space; and transmitting, by the processor to the alert system, a third alert indicating a consolidated message associated with the increasing and the decreasing.

A third aspect of the invention provides a hardware device comprising a processor coupled to a computer-readable memory unit, the memory unit comprising instructions that when executed by the computer processor implements a disk capacity reorganization improvement method comprising: monitoring via a plurality of sensors, by the processor executing daemon code, a utilization level of a disk storage space of a disk drive; determining, by the processor based on results of the monitoring, that the utilization level has exceeded a utilization level threshold; analyzing, by the processor, reorganization and associated alert hardware and software functionality associated with modifying the utilization level; transmitting, by the processor to an alert system, a first alert indicating that the utilization level has exceeded the utilization level threshold; decreasing, by the processor based on results of the analyzing, the utilization level; increasing, by the processor based on the results of the analyzing, the disk storage space of the disk drive, wherein the increasing and the decreasing occur until an actual size of the disk storage space is equivalent to a measured destination size for the disk storage space, wherein the measured destination size is automatically determined by referring configured parameter values; transmitting, by the processor to the alert system, a second alert indicating that the utilization level has decreased below the utilization level threshold such that the disk storage space is claimed by decreasing a size of an identified filesystem or paging space and assigned to an affected filesystem or paging space; and transmitting, by the processor to the alert system, a third alert indicating a consolidated message associated with the increasing and the decreasing.

The present invention advantageously provides a simple method and associated system capable of accurately organizing data storage.

DETAILED DESCRIPTION

Figure 1:
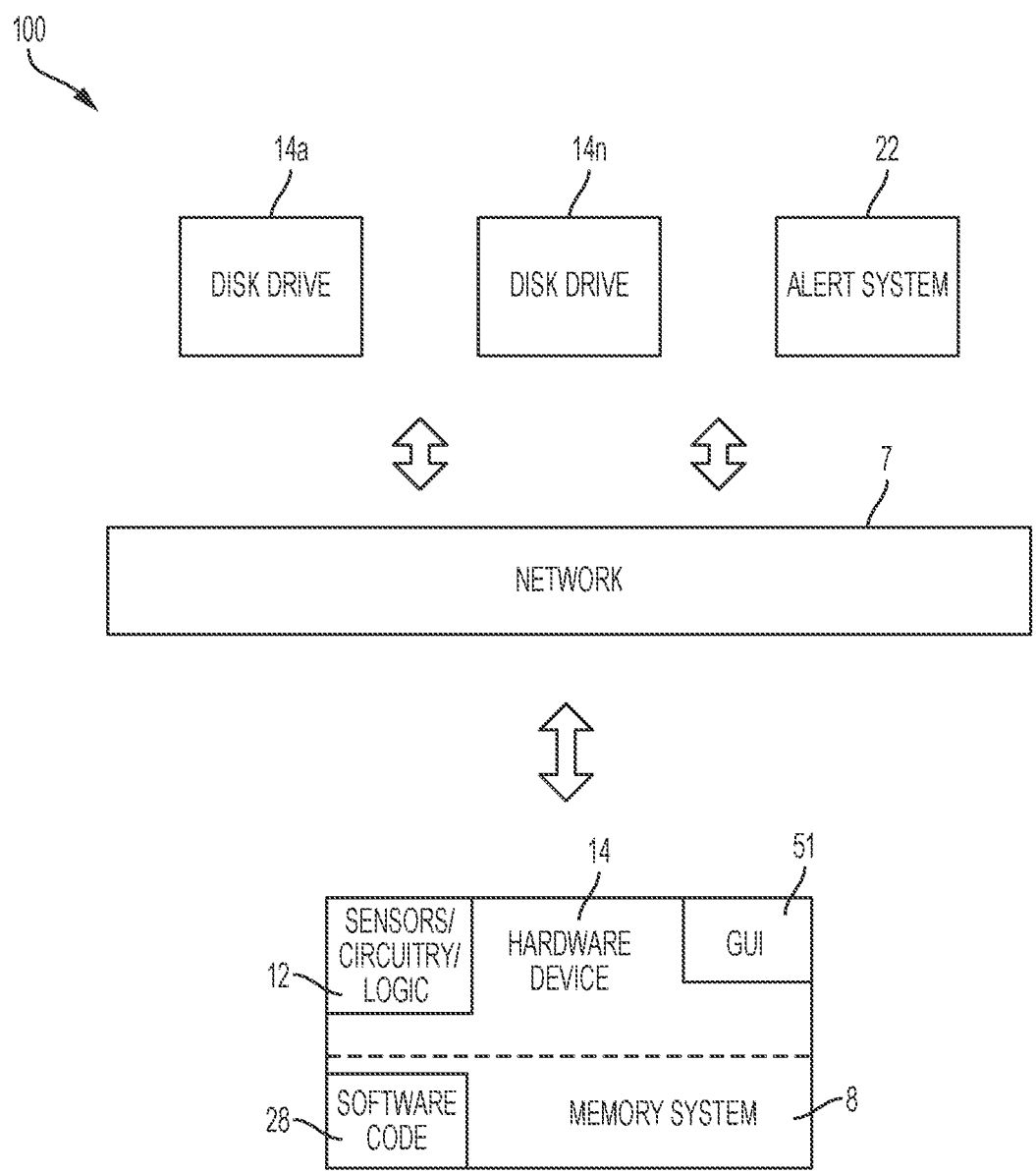
FIG. 1 illustrates a system for improving data storage technology associated with automatically reorganizing a threshold breached filesystem and paging space and generating an associated alert, in accordance with embodiments of the present invention.

FIG. 1 illustrates a system 100 for improving data storage technology associated with automatically reorganizing a threshold breached filesystem and paging space and generating an associated alert, in accordance with embodiments of the present invention. Typical processes for organizing data storage include an inaccurate process with little flexibility. Coordinating multiple data storage solutions typically involves an unreliable process. Controlling and directing various data storage means may include a complicated process that may be time consuming and require a large amount of resources. Therefore, data storage technology improvement process for automatically reorganizing a threshold breached filesystem and paging space is executed. A filesystem is defined herein as a disk space used by an operating system for monitoring and storage of files on a disk or disk partition. A paging space is defined herein as disk space for storing information residing within a virtual memory structure such that when an amount of free random-access memory (RAM) within an associated system is low, programs or data that have not been recently used are transferred from memory to a paging space for releasing a portion of memory for additional activities. The aforementioned improvement in data storage technology improves server accessibility and responsiveness by analyzing multiple filesystems and paging space structures within a same volume group and determining if a critical filesystem has exceeded a predetermined capacity (e.g., defined threshold). In response, system 100 is configured to automatically reorganize a size of the filesystem and paging space and transmit associated activity details to a system administrator based on detected automatic filesystem, paging space reorganization, and alerting (Autofsps) based parameter values. Likewise, an Autofspsd daemon (a computer program running as a background process) is executed for monitoring a filesystem and paging space in accordance with associated Autofsps parameter values.

System 100 enables a process for:
1. Executing options/attributes with respect to an individual filesystem and paging space.
2. Monitoring filesystem and paging space utilization such that when a defined threshold is exceeded, Autofsps reorg and alerting values of the threshold breached filesystem and paging space are analyzed and the utilization level is decreased by increasing a size of the threshold breached filesystem and paging space.
3. Alerting a system administrator via email and log entry.

System 100 of FIG. 1 includes disk drives 14a . . . 14n and an alert system 22 connected through a network 7 to a hardware device 14. Hardware device 14 comprises sensors/circuitry/logic 12, a graphical user interface (GUI) 51, and a (specialized) memory system 8. Memory system 8 comprises software code 28. Memory system 8 may include a single memory system. Alternatively, memory system 8 may include a plurality of memory systems. Disk drives 14a . . . 14n, alert system 22, and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, disk drives 14a . . . 14n, alert system 22, and hardware device 14 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving data storage technology associated with automatically reorganizing a threshold breached filesystem and paging space and generating an associated alert. Sensors/circuitry/logic 12 may include any type of internal or external sensors including, inter alia, GPS sensors, social network code-based sensors, voltage sensors, network traffic sensors, video retrieval devices, heartrate sensors, moisture sensors, blood pressure sensors, temperature sensors, pressure sensors, etc. Network 7 may include any type of network including, inter alia, a local area network, (LAN), a wide area network (WAN), the Internet, a wireless network, etc.

System 100 enables the following process executed by an autofspsd daemon performing the following functions (associated with the filesystem and paging space): monitoring, analyzing, reorganizing, and alerting. The functions are enabled based on specified parameter/setting values of the filesystem and paging space as described, infra. The process is initiated when the autofspsd daemon monitors the filesystem and paging space in real-time and when a utilization threshold (of the filesystem and paging space) has been breached, associated parameter/setting values are analyzed for performing a size reorganization process for the filesystem and paging space. Subsequently, details and a log entry associated with the size reorganization process are transmitted to a configured email ID. The reorganization process is executed with respect to the following parameters/settings defined by an administrator:
1. Autofsps reorg and alerting (e.g., Enable/Disable). The Autofsps reorg and alerting parameter comprises an overall selection for enabling and disabling all reorganization functionality.
2. Autofsps reorg option to select (e.g., increase/decrease/both). The Autofsps reorg option parameter enables an option for selecting either an increase or a decrease (or both) function with respect to a utilization level.
3. Threshold value as a percentage (e.g., 0-100%) for specifying when autofspsd should react.
4. Minimum percentage of free space to maintain before decreasing: (e.g., 25%) a respective filesystem and paging space.
5. Priority for Autofsps reorg to decrease (e.g., 0-10) a respective filesystem and paging space (e.g., 0 is disabled and 10 comprises a highest priority).
6. Minimum percentage of disk space to increase (e.g., 10%) a threshold breached filesystem.
7. A priority for Autofsps reorg to increase (e.g., 0-10) a respective filesystem (e.g., 0 is disabled and 10 is highest priority).
8. Alerting method (e.g., Email/Log/Both) comprising options to select alert method.
9. Email ID for receiving an alert for enabling an option to enter an email id for receiving an activity status via email.
10. Log file path (e.g., var/log/autofspsd.log) for storing an activity log.

System 100 enables the following process for automatically reorganizing a filesystem in response to detecting that the filesystem has reached a utilization level threshold limit:

The process is initiated when an autofspsd daemon monitors the filesystem and the paging space and detects that the filesystem has reached a utilization level threshold limit. In response, the autofspsd daemon analyzes all parameters/settings of the filesystem. For example, when the autofspsd daemon has not executed a filesystem reorganization activity, the autofsps daemon will detect a value of the following parameter/setting of the filesystem: Autofsps reorg and alerting [Disable] and therefore the autofspsd daemon will not execute any reorganization activities with respect to the filesystem. Likewise, when a filesystem size reorganization process is required to increase a size, the autofspsd daemon determines a value of the following parameter/setting of the filesystem: Autofsps reorg and alerting [Enable] and then will check a next parameter/setting of: Autofsps reorg option to select. The parameter Autofsps reorg option to select comprises the following options to be defined: (Increase/Decrease/both). If the selected option is decrease, then the autofspsd daemon will not executed the reorganization process to increase the size of the filesystem. If the selected option is both or increase, then the autofspsd daemon will check a next parameter/setting of Min % of space to increase [10%] for increasing the filesystem such that if the total filesystem size is 100 MB and a threshold has been breached then the file system size should be increased by a minimum by 10 MB. Subsequently, the autofspsd daemon will check the following parameter/setting of the filesystem to determine a priority of the filesystem as follows: Priority for Autofsps reorg to increase [0-10]. If more than one filesystem is identified for increase, then the autofspsd daemon will: compare defined priority values and create and follow a sequence thereby confirming that the filesystem size should be increased. Therefore, additional available filesystems comprising the following parameter/settings with required values are checked so that the additional available filesystems may be decreased and claimed space may be used to increase the required filesystem:
1. Autofsps reorg and alerting [Enable].
2. Autofsps reorg option to select [Both].
3. Autofsps reorg option to select [Decrease].

Additionally, before decreasing the filesystem and claiming the space, the autofspsd daemon will additionally check the following parameter/setting so that the threshold limits are maintained:
1. Min % of free space to maintain [25%] before decreasing the respective filesystem and paging space.
2. Priority for Autofsps reorg to decrease [0-10] the respective filesystem and paging space (0 is disabled, 10 is highest priority, etc.).

System 100 enables the following process for automatically reorganizing a paging space in response to detecting that the paging space has reached a utilization level threshold limit and a filesystem has enough free space to decrease:

The process is initiated when an autofspsd daemon monitors the filesystem and the paging space and detects that the paging space has reached a utilization level threshold limit. In response, the autofspsd daemon analyzes all parameters/settings of the paging space. For example, when the autofspsd daemon has not executed a paging space reorganization activity, the autofsps daemon will detect a value of the following parameter/setting of the paging space: Autofsps reorg and alerting [Disable] and therefore the autofspsd daemon will not execute any reorganization activities with respect to the paging space. Likewise, when a paging space size reorganization process is required to increase a size, the autofspsd daemon determines a value of the following parameter/setting of the paging space: Autofsps reorg and alerting [Enable] and then will check a next parameter/setting of: Autofsps reorg option to select. The parameter Autofsps reorg option to select comprises the following options to be defined: (Increase/Decrease/both). If the selected option is to increase, then the autofspsd daemon will check a next parameter/setting of Min % of space to increase [10%] for increasing the paging space such that if the total paging space size is 1000 MB and a threshold has been breached then the paging space size should be increased by a minimum by 100 MB. If the Autofsps reorg option to select option comprises both or decrease, then the autofspsd daemon will warn a user by displaying the message "reducing the size of the paging space is not recommended". If the user still opts to set the decrease value, then the autofspsd daemon will not execute a reorganization in-terms for increasing the size of the paging space. Additionally (during a process for decreasing the paging space), the autofspsd daemon will monitor a current utilization of the paging space and if it is determined to be heavily utilized then the Autofspsd daemon will generate a notification indicating that the paging space may not be decreased (due to high utilization) thereby avoiding a system crash. Subsequently, the autofspsd daemon will check the following parameter/setting of the paging space to determine a priority of the paging space as follows: Priority for Autofsps reorg to increase [0-10]. If the autofspsd daemon confirms that the paging space size should be increased, then an additional available paging space comprising the following parameter/settings with required values are checked so that the additional available filesystems/paging space may be decreased and claimed space may be used to increase the required paging space:
1. Autofsps reorg and alerting [Enable].
2. Autofsps reorg option to select [Both].
3. Autofsps reorg option to select [Decrease].

Additionally, before decreasing the paging space and claiming the space, the autofspsd daemon will additionally check the following parameter/setting so that the threshold limits are maintained:
1. Min % of free space to maintain [25%] before decreasing the respective filesystem and paging space.
2. Priority for Autofsps reorg to decrease [0-10] the respective filesystem and paging space (0 is disabled, 10 is highest priority, etc.).

System 100 enables the following process for automatically generating and alert associated with the aforementioned filesystem and paging space reorganization processes:

The process is initiated when the autofspsd daemon transmits activity details associated with the reorganization processes to configured mail id. Additionally, the autofspsd daemon saves the activity details to a configured log file for future reference. The aforementioned transmission and saving processes are executed based on the following parameter values of the filesystem and paging space:
1. Alerting method options (e.g., Email/Log/Both).
2. An email ID for receiving an alert or activity status.
3. Log file path (e.g., var/log/autofspsd.log) for storing activity log data.

Figure 2:
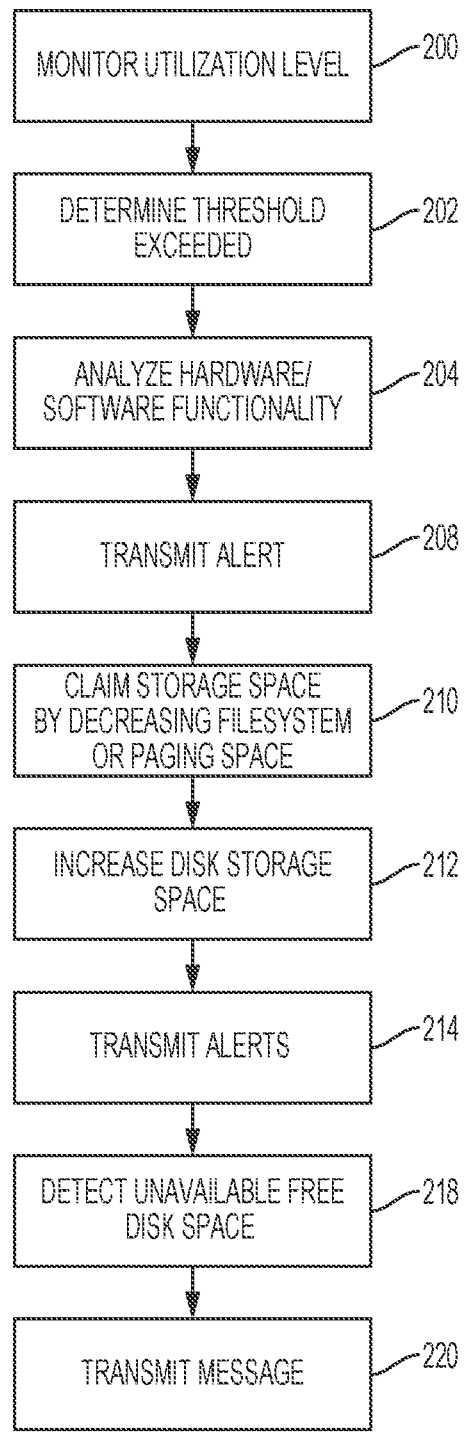
FIG. 2 illustrates an algorithm detailing a process flow enabled by the system of FIG. 1 for improving data storage technology associated with automatically reorganizing a threshold breached filesystem and paging space and generating an associated alert, in accordance with embodiments of the present invention.

FIG. 2 illustrates an algorithm detailing a process flow enabled by system 100 of FIG. 1 for improving data storage technology associated with automatically reorganizing a threshold breached filesystem and paging space and generating an associated alert, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by vehicles disk drives 14a . . . 14n and hardware device 14 of FIG. 1. In step 200, a utilization level of a disk storage space of a disk drive (e.g., a file system, a paging space, etc.) is monitored via a plurality of sensors. In step 202, it is determined (based on results of step 200) that the utilization level has exceeded a utilization level threshold. In step 204, reorganization and associated alert hardware and software functionality associated with modifying the utilization level is analyzed. The analysis may include:

1. Determining a minimum portion of disk storage space to be maintained before decreasing the disk storage space.
2. Determining a priority value for said decreasing the disk storage space.
3. Determining a minimum portion of disk storage space to be increased with respect to the utilization level threshold.
4. Determining an additional priority value for increasing the disk storage space.

In step 208, a first alert (e.g., a digital alert) indicating that the utilization level has exceeded the utilization level threshold is transmitted to an alert system. In step 210, the disk storage space is claimed by decreasing the filesystem or paging space based on results of the analysis of step 204. In step 212, the disk storage space of the disk drive is increased based on results of the analysis of step 204. Steps 210 and 212 are executed until an actual size of the disk storage space is equivalent to a measured destination size for the disk storage space. The measured destination size is automatically determined by referring configured parameter values. In step 214, a second alert and third alert (e.g., a digital alert) are transmitted to the alert system. The second alert indicates that the utilization level has decreased below the utilization level threshold such that the disk storage space is claimed by decreasing a size of the identified filesystem and/or paging space and assigned to an affected filesystem/paging space. The third alert comprises a consolidated message associated with the increasing and decreasing. In step 218, unavailable free disk space of the disk storage space is detected. In step 220, a message indicating that the hardware device is unable to execute a reorganization of the disk drive is transmitted to the alert system based on results of step 218.

Figure 3:
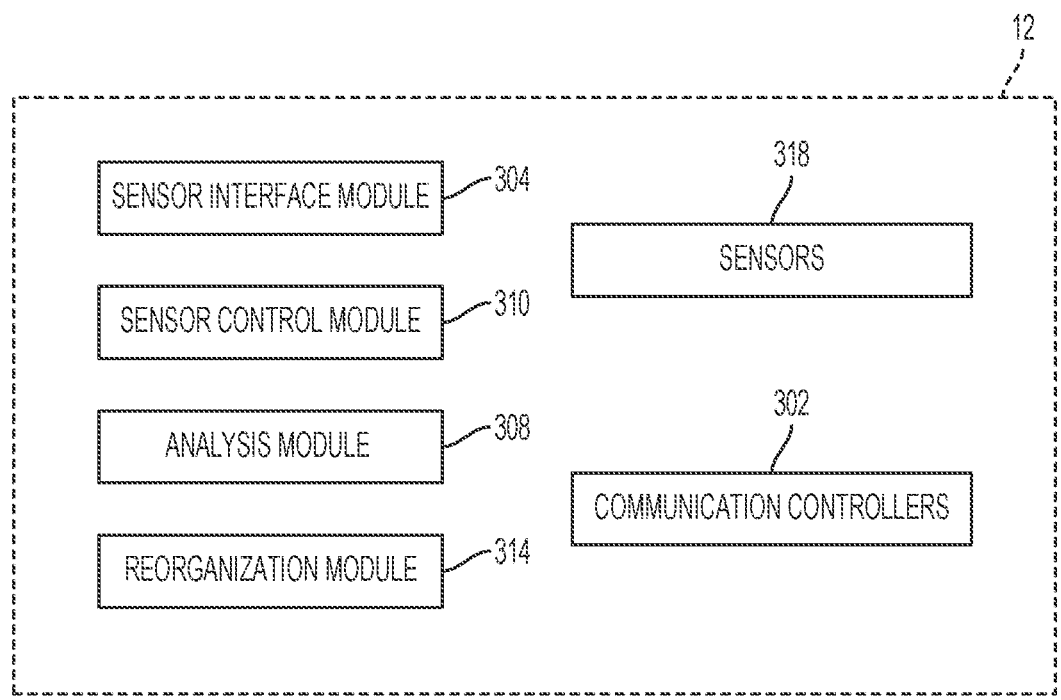
FIG. 3 illustrates an internal structural view of the sensors/circuitry/logic of FIG. 1, in accordance with embodiments of the present invention.

FIG. 3 illustrates an internal structural view of sensors/circuitry/logic 12 of FIG. 1, in accordance with embodiments of the present invention. Sensors/circuitry/logic 12 includes sensors 318, a sensor interface module 304, a sensor control module 310, an analysis module 308, a reorganization module 314, and communication controllers 302. Sensors 318 may include any type of internal or external sensors including, inter alia, GPS sensors, social network code-based sensors, voltage sensors, network traffic sensors, video retrieval devices, heartrate sensors, moisture sensors, blood pressure sensors, temperature sensors, pressure sensors, etc. Sensor interface module 304 comprises specialized hardware and software for controlling all functions related to interfacing with sensors 318. Sensor control module 310 comprises specialized hardware and software for controlling all functionality related to controlling all functions related to control of the sensors 318 and implementing the process described with respect to the algorithm of FIG. 2. Analysis module 308 comprises specialized hardware and software for controlling all functions related analyzing reorganization and associated alert hardware and software functionality associated with modifying a disk storage space utilization level. Reorganization module 314 comprises specialized hardware and software for controlling all functions related to decreasing the disk storage space utilization level and increasing disk storage space of a disk drive as described, supra. Communication controllers 502 are enabled for controlling all communications between sensors 318, sensor interface module 304, sensor control module 310, analysis module 308, and reorganization module 314.

Figure 4:
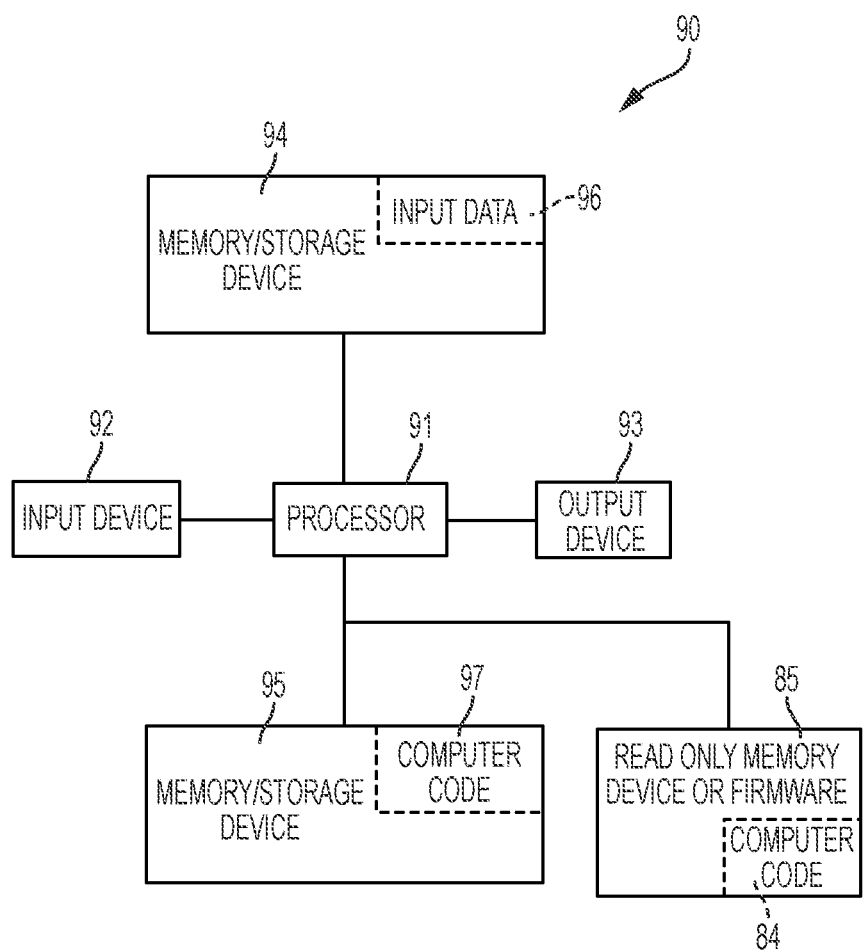
FIG. 4 illustrates a computer system used by the system of FIG. 1 for improving data storage technology associated with automatically reorganizing a threshold breached filesystem and paging space and generating an associated alert, in accordance with embodiments of the present invention.

FIG. 4 illustrates a computer system 90 (e.g., hardware device 14 of FIG. 1) used by or comprised by the system of FIG. 1 for improving data storage technology associated with automatically reorganizing a threshold breached filesystem and paging space and generating an associated alert, in accordance with embodiments of the present invention.

Aspects of the present invention may take the form of an entirely hardware embodiment, an entirely software embodiment (including firmware, resident software, micro-code, scripts, artificial intelligence, bigdata, storage products, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, bios, metadata, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory/storage devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory/storage devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory/storage device 95 includes a computer code 97. The computer code 97 includes algorithms (e.g., the algorithm of FIG. 2) for improving data storage technology associated with automatically reorganizing a threshold breached filesystem and paging space and generating an associated alert. The processor 91 executes the computer code 97. The memory/storage device 94 includes input data 96. The input data 96 includes input required by the computer code 97. The output device 93 displays output from the computer code 97. Either or both memory/storage devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory/storage device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve data storage technology associated with automatically reorganizing a threshold breached filesystem and paging space and generating an associated alert. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving data storage technology associated with automatically reorganizing a threshold breached filesystem and paging space and generating an associated alert. In another embodiment, the invention provides a business method that performs the process steps of the invention on a subscription, advertising, and/or fee basis. That is, a service supplier, such as a Solution Integrator, could offer to enable a process for improving data storage technology associated with automatically reorganizing a threshold breached filesystem and paging space and generating an associated alert. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory/storage devices 94 and 95 may be portions of a single memory/storage device rather than separate memory/storage devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
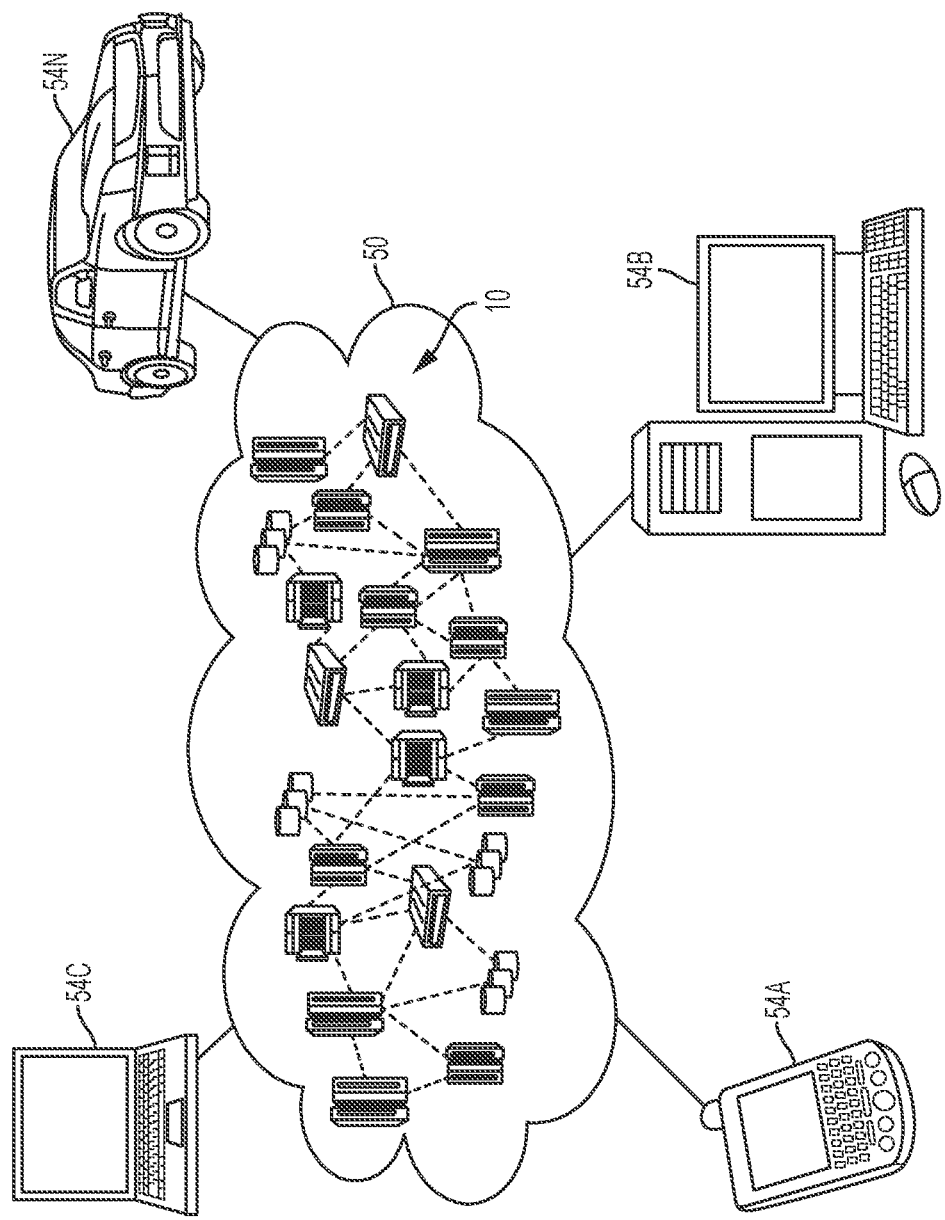
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
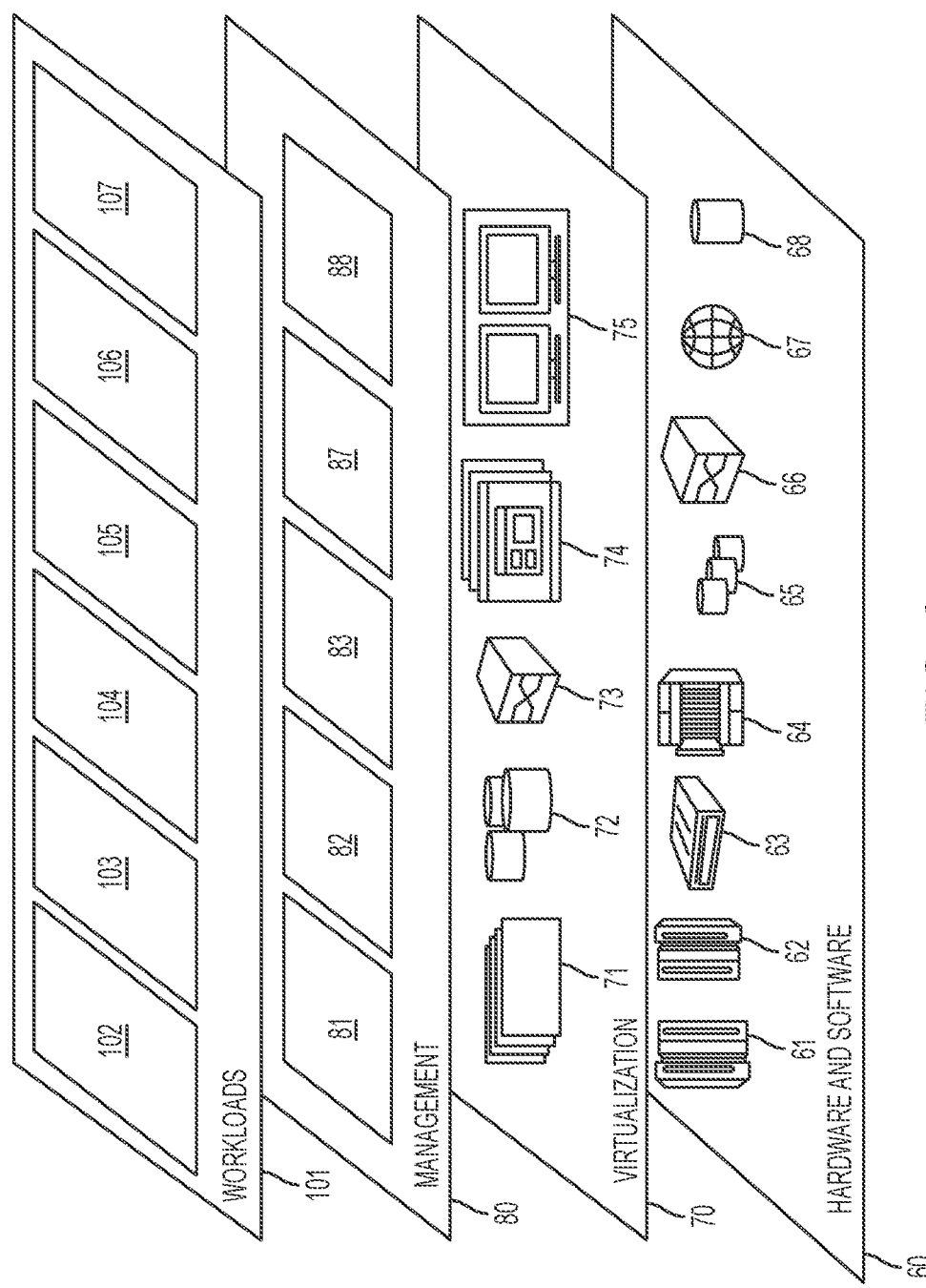
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving data storage technology associated with automatically reorganizing a threshold breached filesystem and paging space and generating an associated alert 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A disk capacity reorganization improvement method comprising:
monitoring via a plurality of sensors, by a processor of a hardware device executing daemon code, a utilization level of a disk storage space of a disk drive;
determining, by said processor based on results of said monitoring, that said utilization level has exceeded a utilization level threshold;
analyzing, by said processor, reorganization and associated alert hardware and software functionality associated with modifying said utilization level;
transmitting, by said processor to an alert system, a first alert indicating that said utilization level has exceeded said utilization level threshold;
decreasing, by said processor based on results of said analyzing, said utilization level;
increasing, by said processor based on said results of said analyzing, said disk storage space of said disk drive, wherein said increasing and said decreasing occur until an actual size of said disk storage space is equivalent to a measured destination size for said disk storage space, wherein said measured destination size is automatically determined by referring configured parameter values;
transmitting, by said processor to said alert system, a second alert indicating that said utilization level has decreased below said utilization level threshold such that said disk storage space is claimed by decreasing a size of an identified filesystem or paging space and assigned to an affected filesystem or paging space;
transmitting, by said processor to said alert system, a third alert indicating a consolidated message associated with said increasing and said decreasing;
determining, by said processor, unavailable free disk space of said disk storage space; and
transmitting, by said processor to said alert system based on results of said determining said unavailable free disk space, a message indicating that said hardware device is unable to execute a reorganization of said disk drive.

2. The method of claim 1, wherein said analyzing said reorganization and associated alert hardware and software functionality comprises: determining a minimum portion of said disk storage space to be maintained before decreasing said disk storage space.

3. The method of claim 2, wherein said analyzing said reorganization and associated alert hardware and software functionality comprises: determining a priority value for said decreasing said disk storage space.

4. The method of claim 3, wherein said analyzing said reorganization and associated alert hardware and software functionality comprises: determining a minimum portion of said disk storage space to be increased with respect to said utilization level threshold.

5. The method of claim 4, wherein said analyzing said reorganization and associated alert hardware and software functionality comprises: determining an additional priority value for increasing said disk storage space.

6. The method of claim 1, wherein said transmitting said first alert, said second alert, and said third alert comprises digitally alerting said alert system.

7. The method of claim 1, wherein said disk storage space comprises a file system.

8. The method of claim 1, wherein said disk storage space comprises a paging space.

9. The method of claim 1, further comprising:
providing at least one support service for at least one of creating, integrating, hosting, maintaining, and deploying computer-readable code in the control hardware, said code being executed by the computer processor to implement: said monitoring, said determining, said analyzing, said transmitting said first alert, said decreasing, said increasing, said transmitting said second alert, and said transmitting said third alert.

10. A computer program product, comprising a computer readable hardware storage device storing a computer readable program code, said computer readable program code comprising an algorithm that when executed by a processor of a hardware device implements a disk capacity reorganization improvement method, said method comprising:
monitoring via a plurality of sensors, by said processor executing daemon code, a utilization level of a disk storage space of a disk drive;
determining, by said processor based on results of said monitoring, that said utilization level has exceeded a utilization level threshold;
analyzing, by said processor, reorganization and associated alert hardware and software functionality associated with modifying said utilization level;
transmitting, by said processor to an alert system, a first alert indicating that said utilization level has exceeded said utilization level threshold;
decreasing, by said processor based on results of said analyzing, said utilization level;
increasing, by said processor based on said results of said analyzing, said disk storage space of said disk drive, wherein said increasing and said decreasing occur until an actual size of said disk storage space is equivalent to a measured destination size for said disk storage space, wherein said measured destination size is automatically determined by referring configured parameter values;
transmitting, by said processor to said alert system, a second alert indicating that said utilization level has decreased below said utilization level threshold such that said disk storage space is claimed by decreasing a size of an identified filesystem or paging space and assigned to an affected filesystem or paging space;
transmitting, by said processor to said alert system, a third alert indicating a consolidated message associated with said increasing and said decreasing;
determining, by said processor, unavailable free disk space of said disk storage space; and
transmitting, by said processor to said alert system based on results of said determining said unavailable free disk space, a message indicating that said hardware device is unable to execute a reorganization of said disk drive.

11. The computer program product of claim 10, wherein said analyzing said reorganization and associated alert hardware and software functionality comprises: determining a minimum portion of said disk storage space to be maintained before decreasing said disk storage space.

12. The computer program product of claim 11, wherein said analyzing said reorganization and associated alert hardware and software functionality comprises: determining a priority value for said decreasing said disk storage space.

13. The computer program product of claim 12, wherein said analyzing said reorganization and associated alert hardware and software functionality comprises: determining a minimum portion of said disk storage space to be increased with respect to said utilization level threshold.

14. The computer program product of claim 13, wherein said analyzing said reorganization and associated alert hardware and software functionality comprises: determining an additional priority value for increasing said disk storage space.

15. The computer program product of claim 10, wherein said transmitting said first alert, said second alert, and said third alert comprises digitally alerting said alert system.

16. The computer program product of claim 10, wherein said disk storage space comprises a file system.

17. The computer program product of claim 10, wherein said disk storage space comprises a paging space.

18. A hardware device comprising a processor coupled to a computer-readable memory unit, said memory unit comprising instructions that when executed by the computer processor implements a disk capacity reorganization improvement method comprising:
monitoring via a plurality of sensors, by said processor executing daemon code, a utilization level of a disk storage space of a disk drive;
determining, by said processor based on results of said monitoring, that said utilization level has exceeded a utilization level threshold;
analyzing, by said processor, reorganization and associated alert hardware and software functionality associated with modifying said utilization level;
transmitting, by said processor to an alert system, a first alert indicating that said utilization level has exceeded said utilization level threshold;
decreasing, by said processor based on results of said analyzing, said utilization level;
increasing, by said processor based on said results of said analyzing, said disk storage space of said disk drive, wherein said increasing and said decreasing occur until an actual size of said disk storage space is equivalent to a measured destination size for said disk storage space, wherein said measured destination size is automatically determined by referring configured parameter values;
transmitting, by said processor to said alert system, a second alert indicating that said utilization level has decreased below said utilization level threshold such that said disk storage space is claimed by decreasing a size of an identified filesystem or paging space and assigned to an affected filesystem or paging space; and
transmitting, by said processor to said alert system, a third alert indicating a consolidated message associated with said increasing and said decreasing;
determining, by said processor, unavailable free disk space of said disk storage space; and
transmitting, by said processor to said alert system based on results of said determining said unavailable free disk space, a message indicating that said hardware device is unable to execute a reorganization of said disk drive.

* * * * *